Oct. 6, 1970  K. W. SCHROEDER ETAL  3,532,940
DEMAGNETIZATION CONTROL SYSTEM

Filed Dec. 30, 1966  4 Sheets-Sheet 1

FIG. I

INVENTORS
KENNETH W. SCHROEDER
BRUCE G. ISAACSON
BY
ATTORNEYS

INVENTORS
KENNETH W. SCHROEDER
BRUCE G. ISAACSON
BY
ATTORNEYS

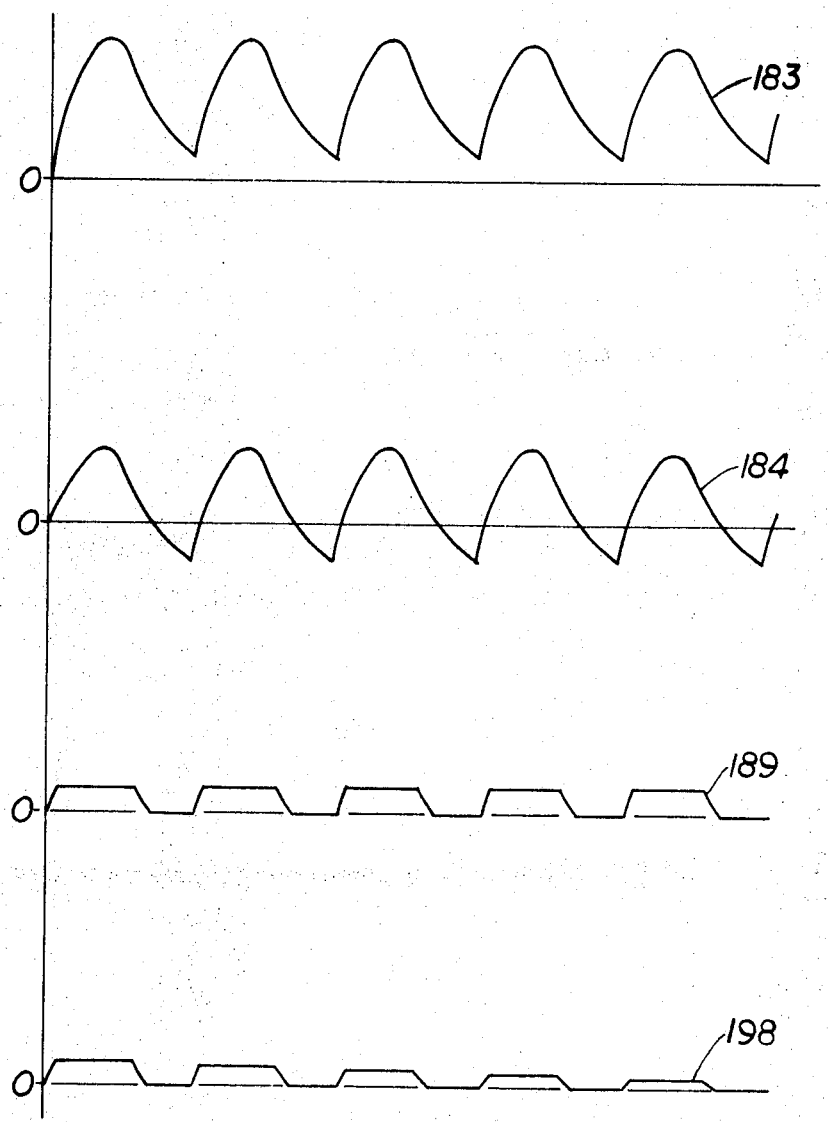

United States Patent Office 3,532,940
Patented Oct. 6, 1970

3,532,940
DEMAGNETIZATION CONTROL SYSTEM
Kenneth W. Schroeder, Arlington Heights, and Bruce G. Isaacson, Park Ridge, Ill., assignors to Magnaflux Corporation, Chicago, Ill., a corporation of Delaware
Filed Dec. 30, 1966, Ser. No. 606,325
Int. Cl. H01f 13/00; H01h 47/00
U.S. Cl. 317—157.5
13 Claims

ABSTRACT OF THE DISCLOSURE

Demagnetizing system for applying periodically reversed magnetic fields of decreasing magnitude to a part. Control signals of changing magnitude are applied in opposition to a demagnetizing current feedback signal to develop an error signal used to control a servo system. The servo system includes saturable reactors between an AC supply and primary windings of step-down transformers which are connected through rectifiers and reversing contacts to contacts engaged with the part or to a coil inductively coupled to the part. When the demagnetizing current is reduced to an intermediate value, the AC supply voltage is decreased and the ratio of the feedback signal to the demagnetizing current is increased, the control signals being thereafter applied to further reduce demagnetizing current to a very low value.

---

This invention relates to an automatic demagnetizing system and more particularly to an automatic demagnetizing system wherein periodically reversed fields of decreasing magnitude are applied to a part, with the timing and form of the fields being very accurately controlled to insure substantially complete demagnetization of the part. The system is highly reliable and efficient in operation.

Automatic demagnetization systems have heretofore been provided wherein a periodically reversed magnetizing current of gradually decreasing magnitude is used to demagnetize a part. Such systems have been relatively large and expensive in construction, have not been capable of applying the desired demagnetizing fields with a high degree of accuracy, and have been subject to malfunctions and breakdown of components.

This invention was evolved with the general object of overcoming the disadvantages of prior systems and of providing a relatively small and inexpensive demagnetizing system wherein an accurately controlled demagnetizing current is applied in a highly efficient manner and with a high degree of reliability.

In accordance with an important feature of this invention, means are provided for developing a gradually changing control signal to control a demagnetizing current supply and to provide a demagnetizing current of decreasing amplitude, with the demagnetizing current being periodically reversed in polarity to accomplish the demagnetization of a magnetized part. The control signal is developed with a high degree of accuracy and by using control means responsive thereto, it is possible to control the demagnetizing current with a corresponding degree of accuracy.

According to another important feature of the invention, the control signal is periodically changed to a value such as to produce a low amplitude demagnetizing current during reversal thereof, so as to minimize arcing at reversing contacts and to improve the stability and reliability of the system.

A further important feature of the invention relates to the use of a servo system in which the control signal is compared to a feedback signal developed in response to the magnetizing current to develop an error signal, means being provided responsive to the error signal for controlling the demagnetizing current.

Another important feature of the invention relates to the use of saturable reactor means in controlling the demagnetizing current which is highly advantageous in that any desired demagnetizing current can be obtained with a high degree of accuracy and without requiring the use of switching contacts subject to arcing and malfunction. This feature is particularly advantageous when the saturable reactor means is used as part of a servo system, in that the saturable reactor means can be readily controlled in response to an error signal.

Still another important feature of the invention is in the provision of means for changing the conditions and mode of operation of the system after the demagnetizing current is reduced to a certain intermediate value, to permit more sensitive and accurate reduction of the demagnetizing current to a very low value, and to obtain substantially complete demagnetization of the part. In accordance with this feature, means are provided for reducing an AC supply voltage applied to the system when the demagnetizing current is reduced to an intermediate value. In addition, means are provided for increasing the sensitivity of the system, preferably and advantageously by increasing the ratio of the feedback signal to the demagnetizing current. Either of such features alone produces a marked improvement in the operation and through a combination of such features, an extremely high degree of accuracy is obtained, with increased reliability.

Additional important features of the invention relate to the form of the control signal and to the means used for developing the control signal. The control signal is preferably changed in magnitude according to a generally exponential function, which produces optimum demagnetization of the part. Preferably, the control signal may be generated by use of a resistance-capacitance network.

Still another feature of the invention relates to the provision of timing means for controlling the operation of reversing contacts and for controlling the operation of the control signal generating means. Preferably, means are provided which are shifted from one stable state to another with the rate of shift from one state to another being controlled to control the rate of periodic reversal of the demagnetizing current. The stepping means may preferably comprise a stepping switch, although other equivalent types of stepping means may be utilized.

This invention contemplates other objects, features and advantages which will become more fully apparent from the following detailed description taken in conjunction with the accompanying drawings which illustrate a preferred embodiment and in which:

FIG. 4 is a view showing signal waveforms produced at certain points of the circuit of the demagnetization signal generator, for explanation of the operation thereof.

Figure 1:
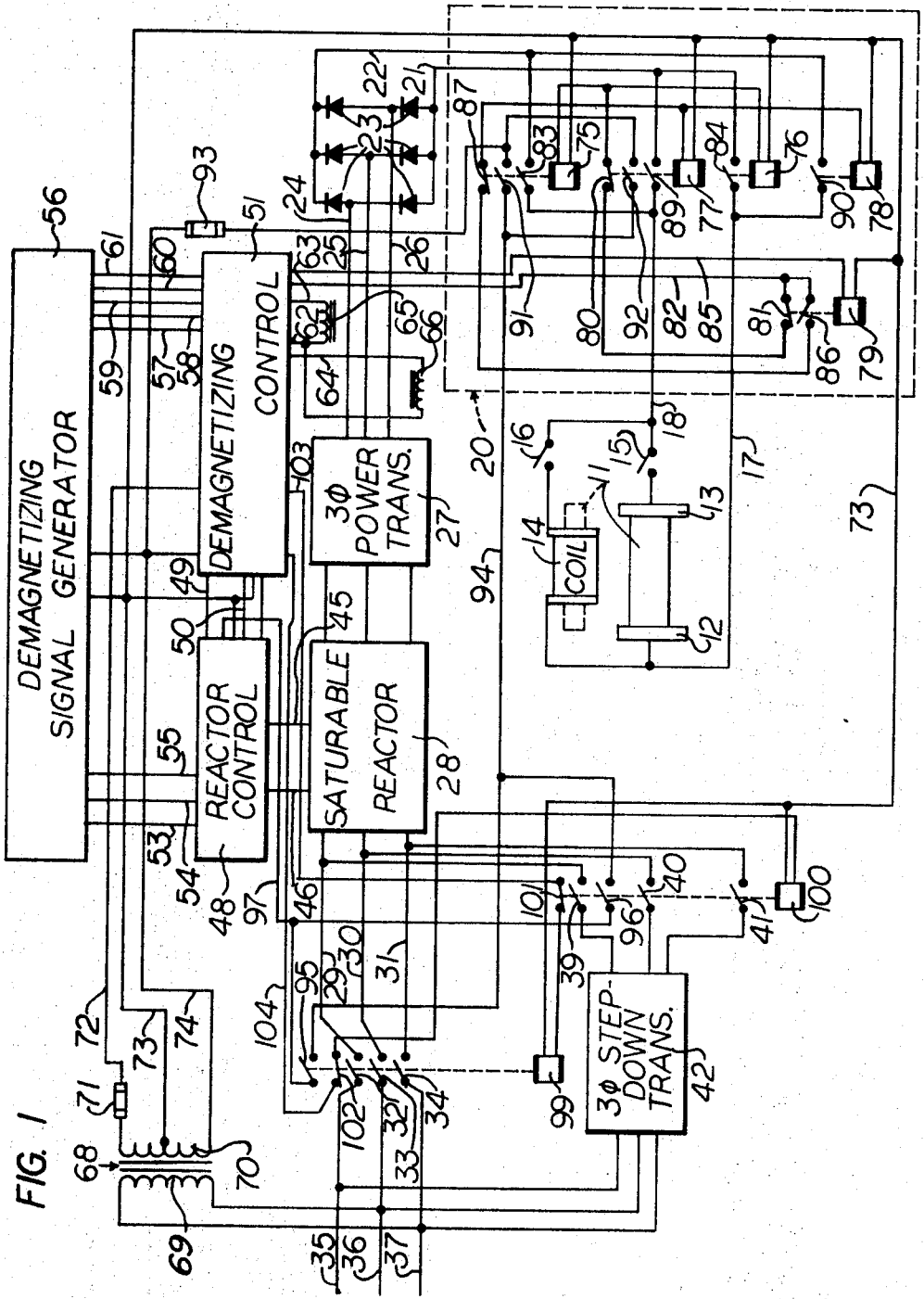
FIG. 1 is a schematic block diagram of magnetic particle inspection apparatus which embodies a demagnetizing system constructed in accordance with the principles of this invention.

Reference numeral 10 generally designates magnetic particle inspection apparatus which embodies a demagnetizing system according to the invention.

In the operation of the apparatus 10, a part 11 to be inspected is placed between contacts 12 and 13 or within a coil 14 and either a contact 15 is closed to pass current through the part 11 or a contact 16 is closed to pass current through the coil 14 to thereby magnetize the part 11, the current being supplied from lines 17 and 18. During or after magnetization of the part 11, magnetic particles may be distributed over the part to be magnetically attracted to areas of the part having cracks or defects therein. The magnetic particles may desirably be carried in a suitable fluid.

The demagnetization system of this invention is designed to automatically demagnetize the part 11 after it is inspected, it being noted that the principles of this invention are applicable in any circumstances in which it is desirable to demagnetize any part of any kind.

In general, the system operates to supply a relatively high rectified current to the lines 17 and 18 in one direction for a certain time interval which may be on the order of 0.4 seconds, by way of example. At the end of that time interval, the current is reduced to substantially zero or to a relatively low value and reversing relays are operated. A rectified current is then applied in a reverse direction having a value which is relatively high but less than that applied during the preceding time interval. The current is again reduced to substantially zero or to a very low value, reversing relays are again operated and rectified current is applied for a third time interval in the same direction as in the first time interval, having a value less than that applied during the second time interval.

This cycle is repeated with the peak currents being gradually reduced, preferably according to an exponential function and the peak value of demagnetizing current applied during the final cycle is very low, so that the remanent magnetization of the part is correspondingly low.

The lines 17 and 18 are connected through a reversing relay assembly 20 to output lines 21 and 22 which are connected through rectifiers 23 to lines 24, 25 and 26 which are connected to low voltage, high amperage secondary windings of a three-phase step-down transformer 27. Primary windings of the transformer 27 are connected through windings of a saturable reactor unit 28 to lines 29, 30 and 31 which are connected through contacts 32, 33 and 34 to the three-phase supply lines 35, 36 and 37. The lines 35, 36 and 37 may be connected to a three-phase, 460 volt, 60 cycle supply, by way of example.

In accordance with an important feature of the invention, the supply voltage is automatically reduced when the demagnetization current has been reduced to a certain level. For this purpose, lines 29, 30 and 31 are connected through contacts 39, 40 and 41 to secondary windings of a step-down transformer 42 having primary windings connected to the supply lines 35–37. When the demagnetizing current is reduced to a certain level, an operating coil for the contacts 32–34 is deenergized and an operating coil for the contacts 39–41 is energized, to disconnect the lines 29–31 from the lines 35–37 and to connect the same through the contacts 39–41 to the secondary windings of the step-down transformer 42. By way of example, the secondary windings of the transformer 42 may supply 120 volt, three-phase, 60 cycle current.

Control windings of the saturable reactor unit 28 are connected through lines 45 and 46 to a reactor control unit 48 which is connected through lines 49 and 50 to a demagnetization control unit 51.

The reactor control unit 48 is connected through lines 53, 54 and 55 to a demagnetizing signal generator unit 56. The demagnetizing control unit 51 is also connected to the signal generator unit 56 through lines 57–61 and is additionally connected through lines 62, 63 and 64 to a pair of feedback transformers 65 and 66, inductively coupled to the lines 24 and 26 to supply signals proportional to demagnetizing current.

In general, the demagnetizing control unit 51 functions to control operation of the contacts 32–34 and the contacts 39–41 to control supply of alternating current to the input of saturable reactor 28. The demagnetizing control unit 51 additionally responds to signals from the signal generator unit 56 to control operation of the reversing relay unit 20 and further operates to control application of current signals from the feedback transformers 65 and 66 to the reactor control 48. The demagnetizing signal generator 56 operates to supply periodic reversing signals to the control unit 51 and to apply signals of gradually changing magnitude to the reactor control unit 48 which operates to control the saturable reactor 28 in a manner such that the current is gradually reduced.

To supply operating power for the units 20, 48, 51 and 56, a transformer 68 is provided which includes a primary winding 69 connected to lines 36 and 37 and a secondary winding having one end connected through a fuse 71 to a line 72, having a center tap connected to a line 73, and having an opposite end connected to a line 74. Line 73 is connected to relays 75, 76, 77, 78 and 79 in the reversing unit 20. The relays 75 and 76 are connected through a normally closed contact 80 of relay 77 and through a normally closed contact 81 of the relay 79 to a line 82 which is connected through the control unit 51 to the line 74, to thereby energize the relays 75 and 76. Contacts 83 and 84 are then closed to connect lines 17 and 18 to lines 21 and 22, for supply of rectified current in one direction.

To reverse the current, voltage is applied from line 74 through a relay contact in the demagnetizing control unit 51 to a line 85 to energize the relay 79 and to open the contact 81 and close a contact 86. A circuit is then completed through contact 86 and a normally closed contact 87 of the relay 75 to energize the relays 77 and 78. With relays 77 and 78 energized, contacts 89 and 90 are closed to connect lines 17 and 18 to lines 22 and 21, respectively, for supply of demagnetizing current in the reverse direction.

The relays 75 and 77 have normally open contacts 91 and 92 connected in parallel so that upon energization of either of the relays, a circuit is completed from line 74 through a fuse 93 and through one of the contacts 91 or 92 to a line 94. Line 94 is connected through a pair of contacts 95 and 96 in parallel to a line 97 connected to the reactor control unit 48 for supply of operating voltage thereto. The contacts 95 and 96 are respectively ganged to the contacts 32–34 and 39–41 and are operated by relays 99 and 100 which have terminals connected to the line 73 which is connected to the center tap of the transformer secondary winding 70. The other terminals of the relays 99 and 100 are respectively connected through normally closed interlock contacts 101 and 102 of the relays 100 and 99, respectively, to lines 103 and 104 which are connected to the control unit 51.

Figure 2:
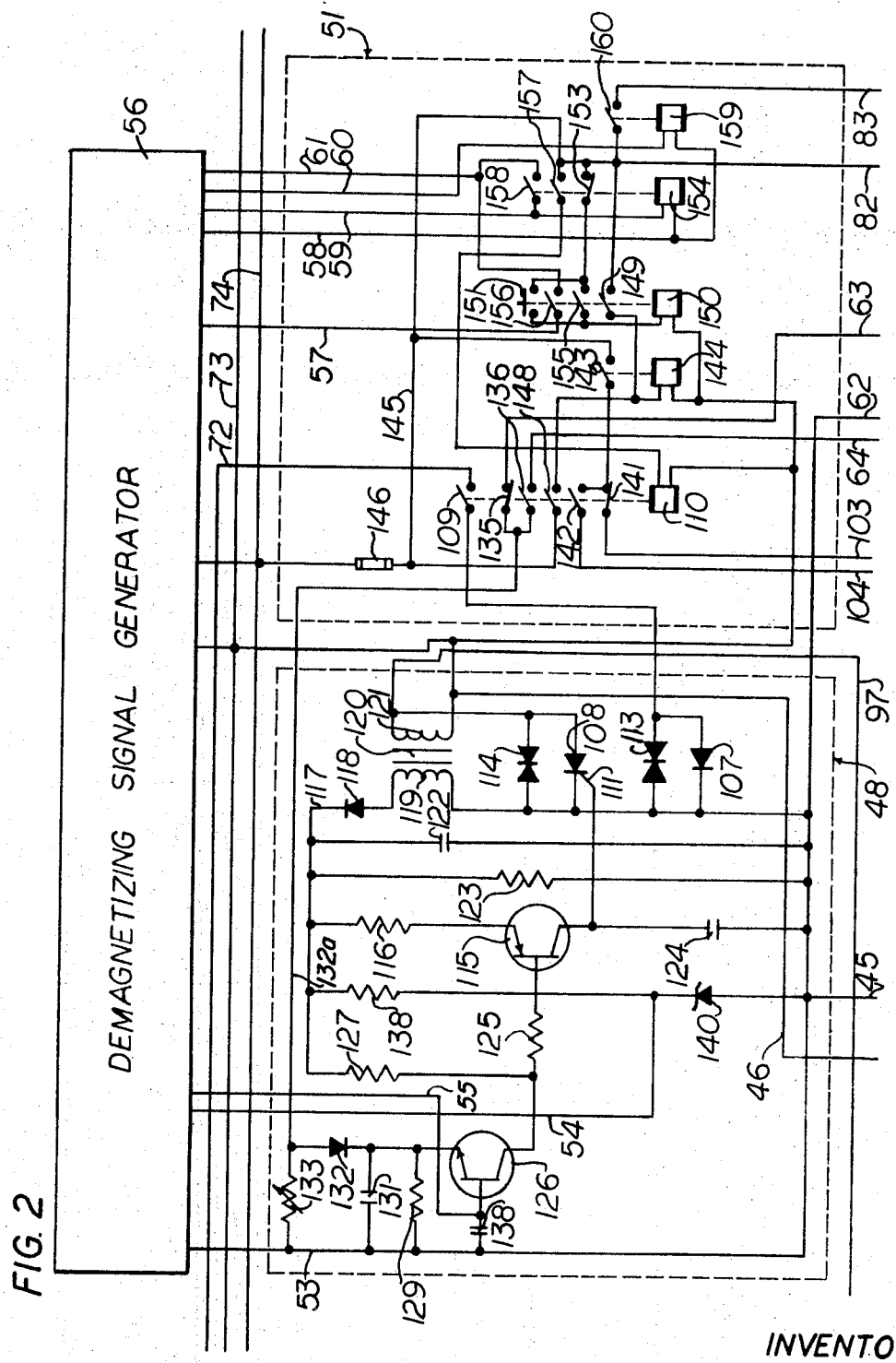
FIG. 2 is a schematic diagram illustrating the circuits of a reactor control unit and a demagnetization control unit shown in block form in FIG. 1.

The circuit of the reactor control unit 48 is shown in FIG. 2. The unit operates to supply DC current from line 45 and through control windings in the saturable reactor 28 to line 46 to control the effective impedance of AC coils in the saturable reactor 28 and to thereby control demagnetizing current. The effective impedance of the AC coils are high when the DC control current is low and is relatively low when the DC control current is high.

Line 46 is connected to the line 73 which is connected to the center tap of the secondary winding 70 of the supply transformer 68, shown in FIG. 1. Line 45 is connected to the cathodes of a pair of rectifiers 107 and 108. The anode of rectifier 107 is connected through a contact 109 of a relay 110 in the control unit 51 to the line 72. The anode of rectifier 108 is connected to the line 97 which as previously described in connection with FIG. 1 is connected through either contact 95 or contact 96 and through either contact 91 or contact 92 to the line 74. The rectifier 107 is of a standard type and conducts for substantially a full half cycle when the anode thereof is at a positive potential. The rectifier 108 is a silicon-controlled rectifier having a gate electrode 111 to which a control signal is applied to render it either conductive or non-conductive and to thus control the current through the saturable reactor control winding. The amount of current passing through the rectifier 107 is quite low when the controlled rectifier 108 is cut off and it is possible to apply a wide range of control current while using only one controlled rectifier. To suppress transient voltages and protect the rectifiers 107 and 108, a pair of thyrectors 113 and 114 are respectively connected in parallel therewith.

To control the rectifier 108, the gate electrode 111 thereof is connected to the collector of a transistor 115 having an emitter connected through a resistor 116 to a line 117 which is connected through a diode 118 to one terminal of a secondary winding 119 of a transformer 120 having a primary winding 121 connected between the lines 73 and 97, the other terminal of the secondary winding 119 being connected to the line 45. Thus a rectified voltage is developed between lines 45 and 117. A filter capacitor 122 and a resistor 123 are connected between lines 45 and 117 to stabilize the voltage. Another capacitor 124 is connected between the gate electrode 111 and the line 45 to stabilize the control voltage.

The base of the transistor 115 is connected through a resistor 125 to the collector of a transistor 126 which is connected through a resistor 127 to the line 117. The emitter of the transistor 126 is connected to the line 45 through the parallel combination of a resistor 129 and a capacitor 131 and is also connected through a diode 132 to a line 132a which is connected through a variable resistor 133 to the line 53. Line 132a is connected through either a normally closed contact 135 of the relay 110 to the line 63, or through a normally open contact 136 of the relay 110 to the line 64 to be connected to either the feedback transformer 65 or the feedback transformer 66. The diode 131 operates to rectify the signal applied from the feedback transformer to develop at the emitter of the transistor 126 a voltage proportional to demagnetizing current.

The base of the transistor 126 is connected through a capacitor 138 to ground and it is also connected through the line 55 to the signal generator unit 56, to receive a reference voltage therefrom.

In the operation of the circuit, it may be assumed that the load current is initially low and that the voltage applied to line 55 to the base of the transistor 126 is higher than the rectified load current signal applied to the emitter of the transistor 126, thereby rendering the transistor 126 conductive. The potential of the collector of the transistor 126 is then low, and the transistor 115 is rendered conductive to apply a current to the gate electrode 111 of the silicon-controlled rectifier 108 sufficient to render the rectifier 108 conductive. Within a few cycles of the AC supply current, the current in the control windings of the saturable reactor 28 is built up to a high value, to apply a relatively high voltage in the load circuit. When the current reaches a certain value such that the signal at the emitter of transistor 126 is greater than the reference voltage applied to the base thereof, the transistor 126 is cut off to cut off the transistor 115 and to cut off the silicon-controlled rectifier 108. The current in the control windings of the saturable reactor 28 then tends to drop to increase the effective impedance of the saturable reactor windings and to decrease the load current. However, if the current drops substantially, such that the reference voltage at the base of the transistor 126 exceeds the voltage at the emitter thereof, the transistor 126 is again rendered conductive to render the transistor 115 conductive and to thereby render the silicon-controlled rectifier 108 conductive. As a result, the load current is automatically maintained substantially constant at a value as determined by the voltage applied through line 55 to the base of the transistor 126 and as determined by the ratio between the load current and the signal developed by the current transformer which is then operative.

It is noted that in accordance with an important feature of the invention, the feedback transformers 65 and 66 have different ratios such that the load current required to develop a predetermined output from the feedback transformer 65 is considerably greater than the load current required to produce the same output from the feedback transformer 66. In the operation of the circuit, the feedback transformer 65 is operative until the demagnetizing current is reduced to a certain level. The feedback transformer 66 is then rendered operative to increase the sensitivity of the system and to then permit a further reduction of the demagnetizing current to a very low value.

It is further noted that the reactor control unit 48 includes a circuit for developing a fixed reference voltage on the line 54. In particular, line 54 is connected through a resistor 139 to the line 117 and through a Zener diode 140 to the line 45, a fixed voltage being thereby developed at the line 54 with respect to the voltage on the line 45. It is also noted that line 45 is connected directly to the line 53, connected to the signal generator unit 56.

With regard to the control unit 51, the relay 110 as above described controls the contact 109, to control application of a supply voltage to the reactor control unit 48 and also controls contacts 135 and 136 to control connection of the feedback transformers 65 and 66 to the reactor control unit 48. The relay 110 also includes a normally closed contact 141 and a normally open contact 142 connected to the lines 103 and 104 to selectively connect the lines 103 and 104 through a contact 143 of a relay 144 to a line 145 which is connected through a fuse 146 to the line 74. Thus with the relay 110 deenergized and with the relay 144 energized, a circuit is completed to the line 103 which causes energization of the relay 99 (FIG. 1) to apply a high supply voltage to the input terminals of the saturable reactor unit 28. When relay 110 is energized to close the contact 142 and to open the contact 141, the relay 100 is energized to close the contacts 39–41 and to apply a relatively low supply voltage to the input terminals of the saturable reactor unit 28. The relay 110 additionally includes a contact 148 connected between line 145 and one terminal of the relay 144 with the other terminal of relay 144 being connected to the line 73, thus insuring that the relay 144 is energized whenever the relay 110 is energized.

To effect energization of the relay 144 when relay 110 is not energized, it is connected through a contact 149 of a relay 150 to the line 145. Relay 150 is energized by momentarily depressing the start button 151 which connects the relay 150 through a normally closed contact 153 of a relay 154 to the line 145. A holding contact 155 is connected in parallel with the start button 151. The relay 150 has an additional contact 156 which interconnects the lines 57 and 61, for a purpose as hereinafter described.

Relay 154 has a normally open contact 157 which connects the line 145 to the relay 110 to energize the relay 110 when the relay 154 is energized. The coil of relay 154 has one terminal connected to the line 58 and an opposite terminal connected to the line 59 and also connected through a normally open contact 158 to the line 61. The control unit 51 additionally includes a relay 159 connected between lines 58 and 60 and having a contact 160 connected between line 145 and the line 85 which controls operation of the relay 79 in the reversing unit 20 as heretofore described. It may also be noted that line 82 which supplies operating voltage to the reversing relays, is connected directly to the line 145.

Figure 3:
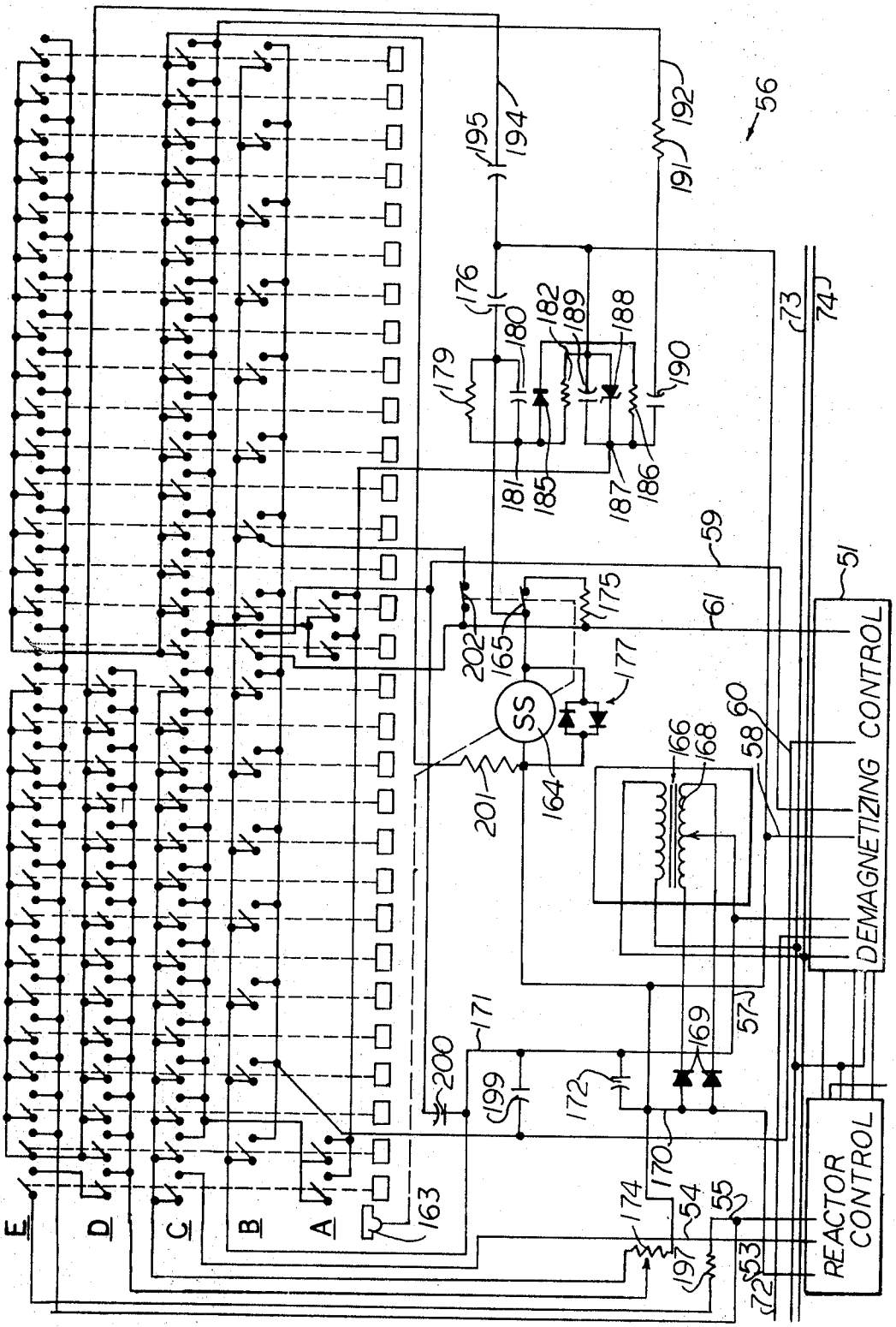
FIG. 3 is a schematic diagram of a demagnetization signal generator unit shown in block form in FIGS. 1 and 2.

The circuit of the demagnetizing signal generator unit 56 is shown in FIG. 3. In general, this unit operates to supply periodic reversing signals to the control unit 51 and to supply signals of gradually changing magnitude to the reactor control unit 48. In general, the unit 56 comprises a stepping switch generally designated by reference numeral 162, having five decks designated as "A" through "E" and having thirty positions, designated as 0 through 29. As diagrammatically illustrated, the respective contacts of all five decks having the same position are effectively ganged together and they are actuated in sequence by a member 163 controlled from an actuator 164. When the actuator 164 is energized, an armature is moved in one direction to open a contact 165 which results in deenergization of the actuator 164. The armature then moves in a reverse direction and through a ratchet, the actuator 163 is advanced one position. The actuator 163 is carried by a shaft and the contacts are arranged in arcuately spaced relation about the axis of the shaft in a manner such that the operator 163 moves from the 29 position directly to the 0 position in one step.

The signal generator unit 56 further includes a circuit for supplying DC power for operation of the stepping switch actuator 164 and for operation of control relays. In particular, a transformer 166 is provided having a primary winding 167 connected between lines 73 and 74 and having a secondary winding 168 which has end terminals connected through diodes 169 to a line 170 and which has a center tap connected to a line 171, with a filter capacitor 172 being connected between lines 170 and 171. Line 170 is connected directly to the line 58 to be connected to terminals of the relays 154 and 159 shown in FIG. 2. Line 171 is directly connected to the line 157 to be connected through the relay contact 156 to the line 61, when the relay 150 is energized, following operation of the start button 151.

In the 0 position, of the stepping switch, a contact of the "C" deck is closed to connect the line 54 to one end of a potentiometer 174, the opposite end of the potentiometer 174 being connected to the line 170 which is connected through the line 53 to the reactor control unit 48. The movable contact of the potentiometer 174 is then connected through contacts in the "D" and "E" decks to the line 55 which is connected to the base of the transistor 126 in the reactor control unit.

As above described, a fixed reference voltage is applied to the line 54 and under such conditions, a voltage is applied to the base of the transistor 126 corresponding to the position of adjustment of the movable contact of potentiometer 174. In this position, the part 11 may be magnetized to a desired extent, for performing the testing thereof for defects.

When the start button 151 is depressed to energize the relay 150 and to close the contact 156 thereof, a circuit is completed from line 61 through a resistor 175 and through the contact 165 to the actuator 164, one terminal of the actuator 164 being connected to the line 170. A capacitor 176 is connected in parallel with the actuator 164 and when the charge of the capacitor 164 builds up to a certain extent, an armature of the stepping switch moves in one direction to open the contact 165, whereupon the actuator 164 is deenergized and the armature moves in a reverse direction to operate through a ratchet, to step the switch from the 0 to the 1 position. The contact 165 is again closed and the capacitor 176 again charges up, until the required voltage is produced across the actuator 164 whereupon an armature is again moved to open the contact 165 to deenergize the actuator 164 and upon return movement of the armature, the sepping swich is moved from the 1 to the 2 position. Thus the stepping switch is automatically advanced at a rate determined by the value of the capacitor 176, the impedance of the actuator 164, the values of resistances in the circuit, the supply voltage and the physical characteristics of the switch. The primary consideration is the value of the capacitor 176 which may be selected to obtain the desired rate of operation.

It is noted that a surge suppression device 177 is connected across the stepping switch actuator 164.

In the operation of the stepping switch, a series of pulses are developed across the actuator 164. Such pulses are applied through a resistor 179 and a capacitor 180 to a circuit point 181 which is connected through a resistor 182 to the line 170, thereby developing at the circuit point 181 a signal having a waveform similar to that developed across the stepping switch actuator 164 but at a different bias level as determined by the average charge developed across the capacitor 180. By way of example, the signal developed across the stepping switch 164 may have a waveform as indicated by reference numeral 183 in FIG. 4, while the signal developed at circuit point 181 may have a waveform as indicated by reference numeral 184.

The signal developed at circuit point 181 is applied through a diode 185 and a resistor 186 to a circuit point 187 which is connected through a Zener diode 188 to the line 170. With this arrangement, a signal is developed at circuit point 187 which is similar to that developed at circuit point 181 but which is clipped at a certain level dependent upon the characteristic of the Zener diode 188. By way of example, the signal developed at circuit point 187 may have a form as indicated by reference numeral 189 in FIG. 4, consisting of a series of relatively long duration pulses of constant amplitude.

The signal so developed at circuit point 187 is applied through a capacitor 190 and a resistor 191 to a line 192. In position 0, line 192 is connected through a contact of the "A" deck to a line connected to the circuit point 187 so that the capacitor 190 and resistor 191 are short-circuited. In position 1, the line 192 is also co nnected through a contact of the "A" deck to the circuit point 187 and line 192 is also connected through a contact of the "C" deck to the upper end terminal of the potentiometer 174 to develop a voltage at the contact of potentiometer 174 proportional to the voltage at circuit point 187. In positions 1 through 13, the movable contact of the potentiometer 174 is connected through contacts of the "D" and "E" decks to a line 194 which is connected through a capacitor 195 to the line 170 and also to a line 196 which is connected through a resistor 197 to the line 55 which is connected to the base of the transistor 126 in the reactor control unit 48. Accordingly, a corresponding voltage is applied to the reactor control unit and the saturable reactor 28 is so controlled as to maintain a proportionate demagnetizing current.

At position 2, the line 192 is disconnected from the circuit point 187, but it remains connected to the upper end of the potentiometer 174 through contacts of the "C" deck. At this time, a charge is built up across the capacitor 190, through current flow through the resistor 191, and as a result, the voltage at line 192 is somewhat less than the voltage at circuit point 187. At position 3, the same conditions prevail but the charge across the capacitor is built up further, to further reduce the voltage at the line 192. Accordingly, a series of pulses are developed at the line 192 of gradually decreasing magnitude. By way of example, the signal at the line 192 may have a wave form as indicated by reference numeral 198 in FIG. 4. A corresponding signal is applied to the reactor control unit 48, the amplitude being controllable by adjustment of the potentiometer 174.

At alternate positions of the stepping switch, a reversing signal is developed and is applied to the reversing relay unit 20. In particular, at odd numbered positions of the stepping switch, the line 171 is connected through contacts of the "B" deck to the line 60, a capacitor 199 being preferably connected between line 60 and line 171. Line 60 is connected to the relay 159 in the control unit 51 and closes a contact 160 to apply an operating voltage through the line 85 to the relay 79, to effect the reversing action which was previously described.

At position 14 a contact in the "B" deck is closed to connect line 59 to line 61, it being noted that a capacitor 200 is preferably connected between line 59 and line 171. When line 59 is connected to line 61, the relay 154 in the control unit 51 is energized and a holding contact 158 is closed. In addition, contact 157 is closed to energize the relay 110 which causes energization of the relay 100 and deenergization of the relay 99, to apply a reduced supply voltage to the input terminals of the saturable reactor 28.

By way of example, the supply voltage may be reduced from 440 volts to 110 volts. In addition, the feedback transformer 65 is disconnected from the reactor control 48 and the feedback transformer 66 is connected thereto. Feedback transformer 66 is arranged to develop a substantially greater output signal in response to the same current. Accordingly, the demagnetizing current obtained with the same reference voltage applied to the reactor control unit 48 is greatly reduced.

At position 14 and also at position 15 the line 192 is connected through contacts of the "A" deck to the circuit point 187 and at position 14, line 192 is connected through a resistor 201 to the line 70 and also through contacts of the E deck to the line 196. Accordingly, in positions 15 through 29, an operation is obtained which is similar to that obtained at positions 2 through 13, except that the voltage is reduced somewhat through the addition of the resistor 201.

As a result of such operations, the demagnetizing current is reduced to an extremely low value when position 29 is reached, and the part 11 is substantially demagnetized. It should be noted that since the gradually changing control signals are produced through resistance-capacitance circuitry, the control signals are changed according to an exponential function, which is highly desirable in obtaining optimum demagnetization.

When the switch is moved from position 29 to position 0, a switch contact 202 is opened to disconnect line 61 from the line 171 and to thereby deenergize the relay 154. With relay 154 deenergized, the contact 157 is opened to deenergize relay 110. Relay 150 is also deenergized, having been deenergized at position 14 when the relay 154 was energized to open the contact 153. With both relays 110 and 150 deenergized, the relay 144 is also deenergized. Thus all relays are placed in the initial condition.

The part 11 can then be removed, and another part can be magnetized and inspected after which another demagnetization cycle can be initiated by closing the push button switch 151.

It will be understood that modifications and variations may be effected without departing from the spirit and scope of the novel concepts of this invention.

We claim as our invention:

1. In a system for automatically demagnetizing a magnetized body, current supply means for supplying a demagnetizing current, demagnetizing signal generator means, control signal means controlled from demagnetizing signal generator means for developing a control signal having a gradually changing magnitude, control means responsive to said control signal for controlling said current supply means to decrease said demagnetizing current, and reversing means controlled from said demagnetizing signal generator means for periodically reversing said demagnetizing current, said control signal being periodically changed to a value such as to produce a low amplitude demagnetizing current during reversal of said demagnetizing current and being changed to values such as to produce progressively lower peak amplitudes of demagnetizing current during time intervals between reversal of said demagnetizing current.

2. In a system as defined in claim 1, timing means for controlling said reversing means for controlling the rate of periodic reversal of said demagnetizing current.

3. In a system as defined in claim 1, said control signal having a magnitude changing with time according to a generally exponential function.

4. In a system as defined in claim 3, said control signal means including a resistance-capacitance network for developing said control signal.

5. In a system as defined in claim 1, said control signal means including means for developing a periodic signal having one value during reversal of said demagnetizing current and having another value at intervals between reversal of said demagnetizing current, and means responsive to said periodic signal for developing said control signal.

6. In a system as defined in claim 5, said means responsive to said periodic signal including a resistance-capacitance network.

7. In a system as defined in claim 5, said means for developing said periodic signal including a stepping switch operated in synchronism with the reversal of said demagnetizing current.

8. In a system for automatically demagnetizing a magnetized body, current supply means for supplying a demagnetizing current, demagnetizing signal generator means, control signal means controlled from said demagnetizing signal generator means for developing a control signal having a gradually changing magnitude, control means responsive to said control signal for controlling said current supply means to decrease said demagnetizing current, and reversing means controlled from said demagnetizing signal generator means for periodically reversing said demagnetizing current, said control means including means for developing a feedback signal in response to said demagnetizing current, means for comparing said feedback signal and said control signal to develop an error signal, and means responsive to said error signal for controlling said demagnetizing current.

9. In a system as defined in claim 8, means for increasing the ratio of said feedback signal to said demagnetizing current after reduction of said demagnetizing current to a certain value.

10. In a system for automatically demagnetizing a magnetized body, current supply means for supplying a demagnetizing current, demagnetizing signal generator means, control signal means controlled from said demagnetizing signal generator means for developing a control signal having a gradually changing magnitude, control means responsive to said control signal for controlling said current supply means to decrease said demagnetizing current, and reversing means controlled from said demagnetizing signal generator means for periodically reversing said demagnetizing current, said current supply means including saturable reactor means having control windings, and means coupling said control windings to said control means.

11. In a system for automatically demagnetizing a magnetized body, current supply means for supplying a demagnetizing current, demagnetizing signal generator means, control signal means controlled from said demagnetizing signal generator means for developing a control signal having a gradually changing magnitude, control means responsive to said control signal for controlling said current supply means to decrease said demagnetizing current, and reversing means controlled from said demagnetizing signal generator means for periodically reversing said demagnetizing current, said current supply means including means for connection to an AC supply line, rectifying means for supplying said demagnetizing current, and means coupling said rectifier means to said AC supply line, said coupling means including step-down transformer means for supplying a reduced AC voltage, and means for applying said reduced AC voltage after reduction of said demagnetizing current to a certain value.

12. In a system for automatically demagnetizing a magnetized body, current supply means for supplying a demagnetizing current, demagnetizing signal generator means, control signal means controlled from said demagnetizing sigal generator means for developing a control signal having a gradually changing magnitude, control means responsive to said control signal for controlling said current supply means to decrease said demagnetizing current, reversing means controlled from said demagnetizing signal generator means for periodically reversing said demagnetizing current, and means for increasing the effective sensitivity of said control means after reduction of said demagnetizing current to a certain value.

13. In a system for automatically demagnetizing a magnetized body, current supply means for supplying a demagnetizing current, demagnetizing signal generator means, control signal means controlled from said demagnetizing signal generator means for developing a control signal having a gradually changing magnitude, control means responsive to said control signal for controlling said current supply means to decrease said demagnetizing current, reversing means controlled from said demagnetizing signal generator means for periodically reversing said demagnetizing current, said control signal being gradually changed in magnitude from one value to another value to reduce said demagnetizing current to a certain value, and means for increasing the effective sensitivity of said control means after reduction of said demagnetizing current to said certain value, said control signal being recycled to be again gradually changed in magnitude from said one value to said another value to reduce said demagnetizing current to a value equal to a small fraction of said certain value.

References Cited

UNITED STATES PATENTS

| | | | |
|---|---|---|---|
| 2,118,174 | 5/1938 | Doane | 317—157.5 |
| 2,632,035 | 3/1953 | Jaeger | 317—157.5 |
| 2,825,854 | 3/1958 | Littwin | 317—157.5 |
| 3,078,396 | 2/1963 | Engelsted | 317—157.5 |
| 3,218,522 | 11/1965 | Littwin | 317—157.5 |
| 3,368,119 | 2/1968 | Littwin | 317—157.5 |
| 3,401,313 | 9/1968 | Littwin | 317—157.5 |

WILLIAM M. SHOOP, JR., Primary Examiner